United States Patent
Davis et al.

(10) Patent No.: US 10,068,454 B1
(45) Date of Patent: Sep. 4, 2018

(54) SENSOR DATA GATHERING, THRESHOLD EXCEEDANCE DETERMINATION, AND ALERT GENERATION MOBILE DEVICE COMMUNICATION SYSTEM

(71) Applicant: VACC, Inc., San Francisco, CA (US)

(72) Inventors: Jon Byron Davis, San Francisco, CA (US); Ahmad Bayat, San Francisco, CA (US)

(73) Assignee: VACC, Inc., San Francisco, CA (US)

( * ) Notice: Subject to any disclaimer, the term of this patent is extended or adjusted under 35 U.S.C. 154(b) by 0 days.

(21) Appl. No.: 15/260,223

(22) Filed: Sep. 8, 2016

Related U.S. Application Data

(60) Provisional application No. 62/216,250, filed on Sep. 9, 2015.

(51) Int. Cl.
  *G08B 1/08* (2006.01)
  *G08B 21/18* (2006.01)
  *H04W 4/02* (2018.01)
  *G08B 29/18* (2006.01)
  *H04L 29/08* (2006.01)

(52) U.S. Cl.
  CPC ......... *G08B 21/182* (2013.01); *G08B 29/185* (2013.01); *H04W 4/023* (2013.01); *H04L 67/12* (2013.01)

(58) Field of Classification Search
  CPC ...... G08B 21/182; G08B 17/06; G08B 21/16; G08B 25/10; F24F 11/006; F24F 11/01; F24F 2011/0063; F24F 2011/0057; G05B 13/026
  USPC .... 340/539.13, 905, 539.26, 539.27, 539.28, 340/539.29
  See application file for complete search history.

(56) References Cited

U.S. PATENT DOCUMENTS

| | | | | |
|---|---|---|---|---|
| 7,378,954 B2 * | 5/2008 | Wendt | ..................... | G01D 9/005 250/370.07 |
| 7,756,683 B2 * | 7/2010 | Kilgus | ............... | G01N 33/0075 700/10 |
| 8,907,803 B2 * | 12/2014 | Martin | ................... | G01N 33/00 340/632 |

* cited by examiner

*Primary Examiner* — Toan N Pham
(74) *Attorney, Agent, or Firm* — Davis Wright Tremaine LLP; Philip H. Albert

(57) ABSTRACT

Methods, systems, and apparatus, including computer programs encoded on computer storage media, for a sensor data gathering, threshold exceedance determination, and alert generation mobile device communication system. One of the methods includes obtaining information associated with sensing instruments monitoring physical characteristics of an environment. Values associated with physical characteristics are determined to have exceeded respective thresholds using the obtained information. Alert information describing the values is generated in response to the determination.

20 Claims, 3 Drawing Sheets

SENSOR DATA GATHERING, THRESHOLD EXCEEDANCE DETERMINATION, AND ALERT GENERATION MOBILE DEVICE COMMUNICATION SYSTEM

This application claims priority to U.S. Patent Application No. 62/216,250, filed Sep. 9, 2015, all of which are incorporated herein by reference in their entirety.

Environmental monitoring is important in many commercial, industrial, and institutional settings. For instance, neighbors adjacent to a construction project can expect the construction project to keep the noise, dust, and other pollutants, to below threshold levels (e.g., levels determined by a governmental organization). To perform environmental monitoring, a business can purchase individual sensors that each determine a particular environmental characteristic (e.g., noise, CO2 emission) and so on. The business can periodically manually download data from these sensors, to determine their compliance with the threshold levels. Furthermore, the business can perform environmental monitoring to verify the safety of a project. For instance, the business can obtain sensors that measure wind velocity, heat associated with particular areas in the project, and so on. The business can periodically manually download data from these sensors, to determine whether a safety concern exists.

A described mobile device (e.g., a smart phone, a cell phone, a tablet, a wearable device, a laptop, a portable computer system) in communication with one or more sensing instruments (e.g., sensors) included in an environment (e.g., a construction project location), can determine whether values, or parameters, determined by the sensing instruments exceed respective thresholds, and can provide alert information describing the determined values. That is, the mobile device can determine whether the sensing instruments are measuring characteristics of the environment (e.g., temperature, wind speed) that are above threshold values stored by the mobile device. The mobile device can provide alert information as one or more text messages, or one or more phone calls to an outside number and provide a voice message (e.g., a pre-recorded message, or the mobile device can have text-to-speech features and describe the determination). Additionally, the mobile device can provide information describing the determination to an arbitrary outside system, or to social networks as updates associated with one or more user accounts. The updates to social networks can be available for viewing by anyone in the public, or by specific people (e.g., supervisor of the construction project, government officials, and so on).

As will be described below, the sensing instruments can be in communication with the mobile device through a wired connection (e.g., Universal Serial Bus connection), a wireless connection (e.g., a Wi-Fi connection, a BLUETOOTH connection), or through an intermediate system (e.g., a microcontroller in communication with a digital signal processing chip (DSP) that measures time or frequency domain information generated by sensing instruments).

In this way, the mobile device can act as a central hub that gathers measurements and parameters of environmental characteristics (e.g., temperatures, wind speed, particular gas levels, sound levels), and provides information to outside people or systems describing whether any parameter or characteristics exceed thresholds. The mobile device can therefore help ensure the safety of a building project (e.g., by monitoring for dangerous environmental characteristics), or to ensure that a building project does not become a nuisance (e.g., by monitoring noise levels).

Particular embodiments of the subject matter described in this specification can be implemented so as to realize one or more of the following advantages. The mobile device can capture data from a multitude of inexpensive, raw sensing elements. The use of inexpensive, high-dynamic-range digital signal processing (DSP) chips with on-board front-ends (along with a simple precision voltage divider for gross ranging) means that little to no signal conditioning is required in some applications. That is to say, a wide array of transducers may be utilized without any attached circuitry in some embodiments. Since the signals are handled generically, in software, any form of digital signal processing may be implemented without changes to firmware or hardware. The presence of a dual-track analytical approach (time-domain signals along with frequency-domain signals) means that users can select whichever analytical domain (or both) is appropriate to their signals. By executing the frequency analyses via FFT (Fast Fourier Transform) on the handset, various analytical methods, as desired, can be implemented side-by-side (e.g., calculations of arbitrary frequency resolution, frequency span, etc.).

In some embodiments, fully integrated instruments having wireless or wired (e.g., USB or BLUETOOTH) communications functionality can be connected to the mobile device via a driver, e.g., a dedicated driver.

From a perspective of a user of the mobile device, this allows an extremely wide range of transducers can be utilized, even on the same platform. Practitioners are preferably not limited to collecting data that are best observed in the time domain (e.g., wind speed) simultaneously with data that are best observed in the frequency domain (e.g., acoustical sound). Additionally, the platform provides a means to interface a vast variety of sensors of any given type: the decision between high-quality ANSI Type-I microphones (typically costing hundreds of dollars each) and inexpensive MEMS microphones (typically costing tens of cents each) is a decision about signal quality and transducer performance rather than about signal interoperability.

Alerts may be sent by email, SMS, or any protocol available on mobile phones (such as automated postings to social media sites like TWITTER or FACEBOOK). The mobile device could even make a phone call and play a pre-recorded warning message to the recipient.

In traditional highly expensive and complex systems that utilize complex server based solutions, all instruments are connected to the system, which can make the system fragile and prone to failure. For instance, a single instrument on a multi-node construction vibration sensing instrument can take down the entire sensing network. In the described mobile device system, since the mobile devices are inexpensive, multiple mobile devices can be placed around an environment and connected to specific sensing instruments. Furthermore, system reliability can be strongly improved via the simple use of redundant, non-interconnected instruments. For example, in high-stakes settings, two different monitors could be situated near each other, each using an independent power source and different wireless mobile device that utilizes different phone/data providers. The value of this approach is readily apparent in property damage and life-safety contexts, where high reliability and instrumentation redundancy is paramount.

In general, one innovative aspect of the subject matter described in this specification can be embodied in methods that include the actions of obtaining information associated with a plurality of sensing instruments monitoring physical characteristics of an environment; determining, using the information, that values associated with one or more physical characteristics have exceeded respective thresholds; and in response to the determination, generating alert information describing the one or more physical characteristics.

Additional embodiments of the disclosure are described below in reference to the appended claims, which may serve as an additional summary of the disclosure.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
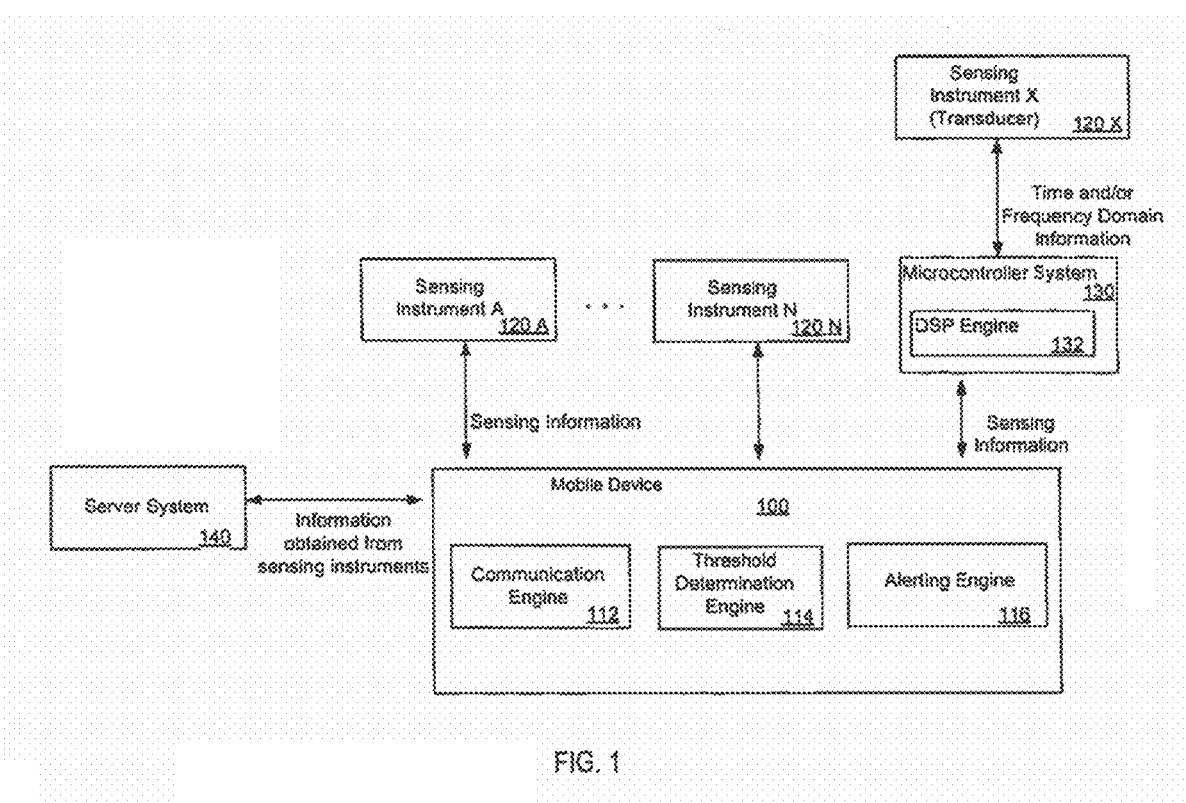
FIG. 1 illustrates a block diagram of an example mobile device m communication with sensing instruments.

FIG. 1 illustrates a block diagram of an example mobile device 100 in communication with sensing instruments (e.g., positioned in an environment such as a construction site, a hazardous area, and so on). As will be described below, the mobile device 100 includes one or more engines (e.g., engines 112-116) that obtain information, process the information, and provide alerts. In some embodiments, the described engines can be included in a same application (e.g., an "app" downloaded from an application store) that executes on the mobile device 100. In this specification, a sensing instrument is any system that can detect an event, or change, in an environment, and provide a corresponding output. In some embodiments, sensing instruments can be systems, modules, software, arbitrary hardware, that determine quantitative values associated with an environment, and particularly associated with a type of characteristic of the environment. For instance, a sensing instrument can be a sensor, and/or a transducer (e.g., a system or device that converts one form of energy to another, such as sound energy into a voltage, current, electrical signal), and can be utilized to measure useful characteristics or parameters of the environment, including wind speed, temperature, moisture content, levels of particular types of gas, sound levels, vibration levels, structural analysis of materials, and so on.

The mobile device 100 includes a communication engine 112 that obtains sensing information from each sensing instrument (e.g., sensing instruments 120A-X). Since mobile devices can include multiple methods of communication technologies, such as wired connections (e.g., Universal Serial Bus (USB), FIREWIRE) and wireless connections (e.g., BLUETOOTH, Wi-Fi, and so on), the communication engine 112 can obtain sensing information utilizing any communication technology. For instance, sensing instrument A 120A can be connected to the mobile device 100 via a USB connection, sensing instrument N 120N can be in communication with the mobile device over BLUETOOTH, and so on.

Additionally, particular sensing instruments, such as inexpensively manufactured transducers, might not include technology to communicate over wired or wireless technology, such as USB or BLUETOOTH. The communication engine 112 can communicate with these sensing instruments, such as sensing instrument X 120X using a microcontroller system 130 as an intermediary. In some embodiments, the microcontroller 130 can communicate with the mobile device 100 using a wired or wireless connection, and can also be included in the mobile device 100.

The microcontroller system 130 can include, or be in communication with (e.g., through a wired connection), a digital signal processor 132 which can sample time history outputs (e.g., voltages sampled at tens of kilohertz, hundreds of kilohertz, megahertz and so on) from the sensing instrument X 120X. In some embodiments, the microcontroller system 130 can perform computations using the time history output, such as a Fast-Fourier Transform or other Transforms, and provide the output of the computation to the mobile device 100. In some embodiments, the microcontroller system 130 can provide the sampled time history output directly to the mobile device 100 for processing. Additionally, the microcontroller system 130 can include a user-selectable precision resistor network which can be used to bring voltages (e.g., from the sensing instrument 120X) to fit within the microcontroller, or DSP, capabilities without "wasting" dynamic range. In this way, little to no signal conditioning is required, and the microcontroller system 130 can sample a wide array of transducers without any further circuitry.

In some embodiments, the communication engine 112 can request information from each sensing instrument (e.g., from sensing instruments 120A-N, or from the microcontroller system 130 in communication with sensing instrument X). That is, the communication engine 112 can poll each sensing instrument at a periodic interval of time (e.g., every 10 seconds, every 30 seconds, every 10 minutes). In some embodiments, each sensing instrument 120A-N can provide information (e.g., as a push) to the mobile device 100. For instance, particular sensing instruments might only report sensing information upon a change in measured characteristics (e.g., a change greater a threshold).

The mobile device 100 includes a threshold determination engine 114 that can obtain sensing information (e.g., unprocessed sensing data) from each sensing instrument 120A-X, and determine whether the sensing instruments are measuring characteristics of the environment that exceed thresholds (e.g., safe thresholds), or are otherwise indicative of requiring an alert. That is, the threshold determination engine 114 can determine whether one or more triggers are satisfied, with triggers being, in some examples, based on whether obtained values from sensing instruments exceed thresholds.

The threshold values can be received from an outside system (e.g., the mobile device can receive instructions to update threshold values), or the threshold values can be manually inputted by a user of the mobile device 100. The mobile device may be programmed either at the handset itself, or via download of a configuration file from a web site. The benefit of the latter is that the programming may be remotely altered at any time. Additionally, a simple signal may be issued to the mobile device to indicate that a full-scale software update (perhaps to support a feature not previously recognized) is awaiting download and installation. All configurational programming and updates may be executed remotely, which greatly improves response time to implement desired changes and eliminates field visits to remote or otherwise distant sites.

Each threshold can be associated with a particular type of environmental characteristic, and the threshold can be compared to sensing information obtained from sensing instruments associated with the same type of environmental characteristic. For instance, values obtained associated with wind speed.

Additionally, the threshold values can depend on a location of the mobile device 100. For instance, the mobile device 100 can obtain its location (e.g., using global positioning system (GPS)), and obtain thresholds associated with governmental codes for the location. As an example, a particular city, or area within a city, might have an allowable noise level, whereas a different city, or area, might have a different allowable noise level. The mobile device 100 can store information identifying different thresholds, or can provide its location to an outside system (e.g., over the Internet) and obtain threshold values. Threshold values can include singular values (e.g., a particular decibel level), a range of acceptable values (e.g., a range of temperatures), or more complex modeling information (e.g., values that define variables of a model compared to sampled information from sensing instruments). Similarly, the threshold values can depend on a present. For instance, threshold values for noise levels can be greater during the working hours of the day, than at night.

As an example, some sensing instruments can provide quantitative information associated with measurements of characteristics, or parameters, of an environment. For instance, some sensing instruments can provide discrete values (e.g., temperature values, or wind speed values). The threshold determination engine 114 can compare the received quantitative information to stored threshold values, and determine whether the received values exceed the threshold values.

Additionally, some sensing instruments (e.g., sensing instrument X), can provide constant output (e.g., a voltage waveform), which the microcontroller system 130 can sample (e.g., utilizing a DSP 132) and provide to the mobile device 100. The threshold determination engine 114 can then perform operations, such as a Fast-Fourier Transform to reveal frequency domain information, and determine whether the calculations reveal unexpected or out of threshold characteristics.

Furthermore, the threshold determination engine 114 can compare multiple values obtained from a sensing instrument to stored models indicative of normal environmental characteristics. For instance, a temperature sensor might record temperatures that exceed a threshold and then return to normal. This might occur when a sensor is located proximate to a worker working with an instrument that creates tremendous heat. The threshold determination engine 114 can have models stored that allows for normal characteristics to include an occasional heat exceedance. In this way, the threshold determination engine 114 can determine the exceedance is within normal working parameters.

The mobile device includes an alerting engine 116 that can provide alerts, or other information, to outside systems, including server systems, smart phones, cell phone or landline phones, and so on. The alerting engine 116 can generate alerts that identify specific sensing instruments (e.g., an identifier of a sensing instrument, a location in which the sensing instrument is placed, a type of characteristic of the environment that the sensing instrument is monitoring) and also, in some embodiments, quantitative information including exceeded threshold values, discrete values obtained from the sensing instruments indicative of measurements of characteristics, and so on.

In some embodiments, the alerting engine 116 can generate an alert associated with a particular sensing instrument after determining that the sensing instrument is measuring a characteristic of the environment that exceeds a threshold for greater than a threshold period of time (e.g., 5 seconds, 10 seconds, 30 seconds). In this way, the alerting engine 116 can avoid providing alerts to outside systems without a sustained exceedance of an environmental characteristic threshold occurring. For instance, a temperature sensor might measure a temperature 20 degrees greater than a threshold, however if the temperature sensor does not measure this temperature for longer than a threshold time, it could be indicative of noise or a temporary failure of the sensor. Additionally, in some embodiments, the alerting engine 116 can discard alerts associated with sensing instruments reporting far out of range values. For instance, a temperature sensor claiming to measure a temperature of 4000 degrees, could in some environments, not be possible and can indicate that the sensor is malfunctioning.

As described above, the alerting engine 116 can provide the generated alerts to disparate systems. For instance, the alerting engine 116 can provide the generated alert as a text message to one or more phone numbers (e.g., user-selectable phone numbers). The generated alert can be formatted to include information appropriate for a text message (e.g., limited character count, and so on). As an example, for a sensing instrument associated with temperature that measured a temperature 20 degrees above a threshold, the alerting engine 116 can provide a text message with a message analogous to "Temperature Sensor 3 measured temperature 20 degrees above threshold", or "Temperature Sensor 3 measured temperature of 120 degrees", or "Temperature Sensor 3 measured temperature of 120 degrees for greater than 10 seconds."

Additionally, the alerting engine 116 can initiating a phone call to one or more outside numbers (e.g., a phone call connected through POTS or through VOIP), and describe the generated alert as speech to an answerer of the phone call (e.g., a human, a messaging system, and so on). To generate speech, the alerting engine 116 can have access to pre-recorded messages that describe sensing instruments measuring characteristics that exceed thresholds. For instance, for a sensing instrument associated with monitoring temperature that measured 20 degrees above a threshold, the alerting engine 116 can obtain speech stating, "Temperature Sensor measured temperature above threshold." Additionally, the alerting engine 116 can obtain disparate audio recordings to include more information, such as obtaining a voice stating "20", and provide speech stating, "Temperature Sensor measured temperature 20 degrees above threshold." In some embodiments, the alerting engine 116 can include, or have access to, text-to-speech technology, and can obtain audio of speech for any arbitrary sensing instrument. The alerting engine 116 can utilize a template, such as "Sensor measured above threshold for seconds", and fill in the blanks based off the sensing instrument and measurement.

Similarly, the alerting engine 116 can provide alerts to social networks. That is, the alerting engine 116 can have credentials (e.g., user name, password) sufficient to access a user of a social network. The alerting engine 116 can provide alert information to the social networks, allowing any employee of a business, or a government official, to quickly determine whether an alert exists.

In some embodiments, a generated alert can include information such as coordinates of the mobile device 100, coordinates of sensing instruments described in the generated alert, images or video taken by the mobile device 100 after determining thresholds were exceeded (e.g., the images or video can show a fire or a gas leak), audio obtained by the mobile device, and so on.

The mobile device 100 can provide all obtained sensing information to a server system 140 for storage. The server system 140 can store sensing information from each sensing instrument as structured data (e.g., data stored in tables associated with particular sensing instruments), or as unstructured data (e.g., the raw unprocessed data can be stored and identified by information including a sensing instrument the data comes from, a location of the mobile device, a time the data was received, ranges of time that correspond to the obtained data, and so on). In some embodiments, the server system 140 can be a cloud storage system, and the mobile device can execute an application (e.g., an "app" downloaded from an application store) associated with the cloud storage system that provides the obtained sensing information for permanent storage on the cloud storage system.

Figure 2:
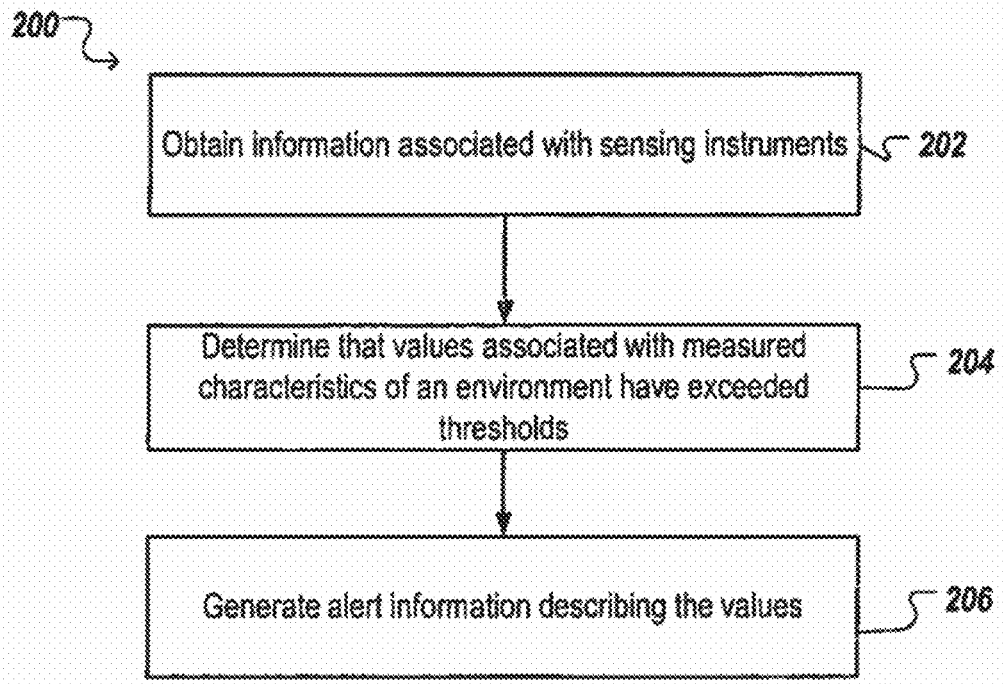
FIG. 2 is a flowchart of an example process for providing alerts describing sensing instruments.
Figure 3:
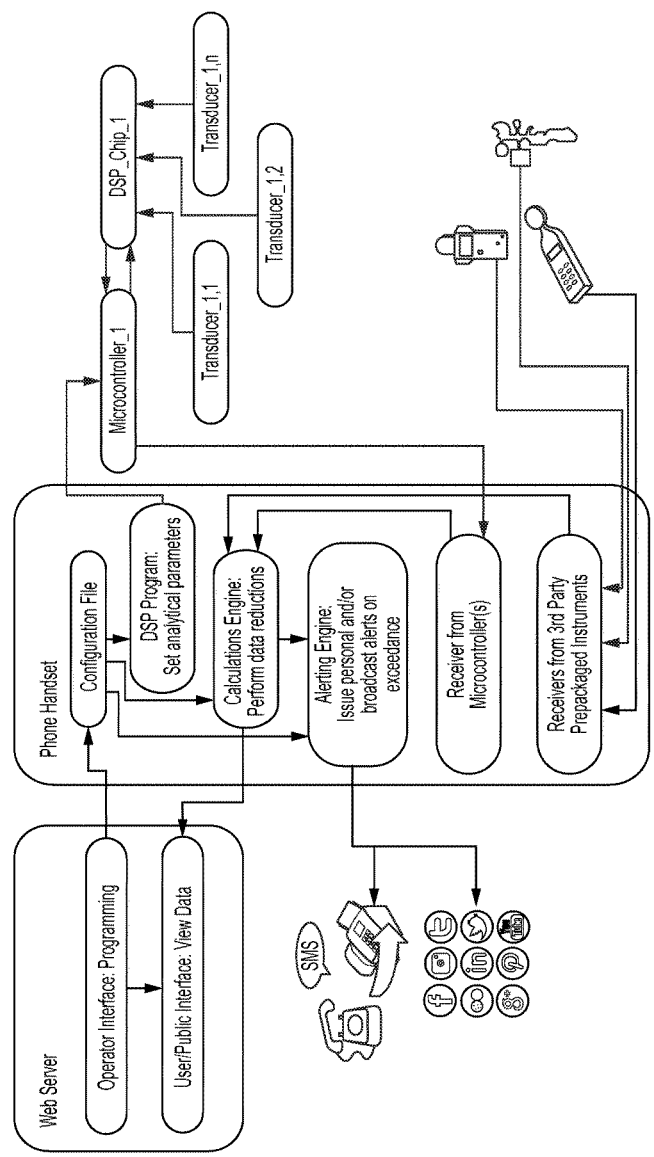
FIG. 3 illustrates a block diagram of an example embodiment of a mobile device in communication with sensing instruments.

FIG. 2 is a flowchart of an example process 200 for providing alerts describing sensing instruments. For convenience, the process 200 will be described as being performed by a system of one or more processors (e.g., the mobile device 100).

The mobile device obtains information associated with sensing instruments (block 202). As described above, the mobile device is in communication with one or more sensing instruments (e.g., sensors) measuring, or monitoring, environmental characteristics which can include any aspect of the physical world which can be quantitatively measured. For instance, sensing instruments can monitor changes, and determine values associated with, sound levels, wind speeds, gas levels, heat, particulate matter in the air, air quality, radioactivity, and so on.

Some sensing instruments can include functionality to communicate directly with the mobile device (e.g., through application programming interface API calls) over one or more connections (e.g., USB, BLUETOOTH, infra-red, Wi-Fi, and so on). Additionally, some sensing instruments (e.g., transducers) can output time-varying outputs (e.g., voltage, current) which the mobile device, or an outside microcontroller system, can sample (e.g., to obtain discrete samples). The mobile device can then perform computations on the sampled data (e.g., frequency domain transforms, time domain functions), and store the computations as values associated with the sensing instrument.

As described above, the mobile device can obtain information periodically (e.g., periodically poll each sensing instrument), or the sensing instruments can provide information (e.g., as a constant time-varying output, as discrete values at particular times, and so on).

The mobile device determines that values associated with measured characteristics of an environment have exceeded thresholds (block 204). The mobile device can compare the received values to stored threshold values, and determine whether the thresholds have been exceeded. As described above, each threshold can be associated with a type of environmental characteristic being measured, and can be altered depending on a time (e.g., time of day, time of year), and/or a present location.

The mobile device generates alert information describing the determined values (block 206). Upon a positive determination that values associated with one or more sensing instruments have exceeded respective thresholds, the mobile device can generate alerts describing the values. As described above, the mobile device can provide alerts as text messages, phone calls, or updates to social network accounts.

Each of the processes, methods, and algorithms described in the preceding sections may be embodied in, and fully or partially automated by, code modules executed by one or more computer systems or computer processors comprising computer hardware. The code modules (or "engines") may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

In general, the terms "engine" and "module", as used herein, refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage. Electronic Data Sources can include databases, volatile/non-volatile memory, and any memory system or subsystem that maintains information.

The various features and processes described above may be used independently of one another, or may be combined in various ways. All possible combinations and subcombinations are intended to fall within the scope of this disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While certain example embodiments have been described, these embodiments have been presented by way of example only, and are not intended to limit the scope of the disclosure. Thus, nothing in the foregoing description is intended to imply that any particular element, feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate embodiments are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A system for monitoring the environment, comprising:
    a plurality of sensing instruments monitoring and measuring a plurality of physical characteristics of the environment, a respective sensing instrument generating sensing information indicating a measured quantitative value of a respective physical characteristic of the environment;
    a mobile device having a first hardware processor configured to
        receive, via a communication path, the sensing information from the respective sensing instrument,
        receive a plurality of predetermined thresholds, a respective predetermined threshold being associated with the respective physical characteristic of the environment,
        compare the obtained sensing information and the respective predetermined threshold,
        determine, based on the comparison, whether the sensing information exceeds the respective predetermined threshold associated with the respective physical characteristic of the environment, and
        generate, based on the determination, an alert identifying the respective sensing instrument among the plurality of sensing instruments when the sensing information exceeds the respective predetermined threshold associated with the respective physical characteristic of the environment; and
    a server configured to store the obtained sensing information.

2. The system of claim 1, wherein the respective sensing instrument is at least one of a sensor and a transducer.

3. The system of claim 1, wherein the measured quantitative value is one of a discrete value and a constant output.

4. The system of claim 1, wherein the respective physical characteristic of the environment is at least one of a wind speed, a temperature, a moisture content, a gas level, a decibel level and a vibration level.

5. The system of claim 1, wherein the communication path is at least one of a wired communication network and a wireless communication network.

6. The system of claim 1, further comprising a microcontroller coupled to the mobile device via the communication path, the microcontroller having a hardware processor configured to
    sample outputs of respective sensing instruments in at least one of a time and frequency domain, and
    transmit the sampled outputs to the mobile device.

7. The system of claim 1, further comprising a microcontroller coupled to the mobile device via the communication path, the microcontroller having a hardware processor configured to
    sample outputs of respective sensing instruments in at least one of a time and frequency domain,
    process the sampled outputs by a transform such as a Fast Fourier Transform, and
    transmit the sampled outputs as the sensing information to the mobile device.

8. The system of claim 1, wherein the mobile device polls the plurality of sensing instruments at a periodic interval of time to request the sensing information.

9. The system of claim 1, wherein the plurality of predetermined thresholds are received from a system independent of the system for monitoring the environment or the plurality of predetermined thresholds are input to the mobile device by a user of the mobile device.

10. The system of claim 1, wherein the plurality of predetermined threshold values depend on a location of the mobile device.

11. The system of claim 1, wherein the plurality of predetermined threshold values is one of a singular value, a range of values and modeling information based on a comparison of a model variable value and the sensing information.

12. The system of claim 1, wherein the mobile device compares multiple quantitative values obtained from the sensing information with stored models indicative of normative physical characteristics of the environment.

13. The system of claim 1, wherein the mobile device transmits the generated alert to at least one of a server, a cellular phone, a land line and a social network via at least one of an email, SMS protocol, an automated posting to social media and a phone call.

14. The system of claim 1, wherein the generated alert can identify at least one of the respective sensing instrument, a location of the respective sensing instrument, coordinates of the mobile device and the respective physical characteristic of the environment being monitored and measured by the respective sensing instrument.

15. The system of claim 1, wherein the generated alert is generated after determining the sensing information exceeds the respective predetermined threshold for a predetermined threshold period.

16. An environmental monitoring method, comprising the steps of:
   generating sensing information by respective sensing instruments among a plurality of sensing instruments monitoring and measuring a plurality of physical characteristics of an environment, the sensing information indicating a measured quantitative value of a respective physical characteristic of the environment;
   obtaining, by a mobile device and via a communication network, the sensing information from the respective sensing instrument;
   storing, by the mobile device, a plurality of predetermined thresholds, a respective predetermined threshold being associated with the respective physical characteristic of the environment;
   comparing, by the mobile device, the obtained sensing information and the respective predetermined threshold;
   determining, by the mobile device and based on the comparing, whether the sensing information exceeds the respective predetermined threshold associated with the respective physical characteristic of the environment; and
   generating, by the mobile device and based on the determining, an alert identifying a respective sensing instrument when the sensing information exceeds the respective predetermined threshold associated with the respective physical characteristic of the environment.

17. The environmental monitoring method of claim 16, wherein the respective physical characteristic of the environment is at least one of a wind speed, a temperature, a moisture content, a gas level, a decibel level and a vibration level.

18. An mobile device for monitoring an environment, comprising:
   a first hardware processor configured to:
      receive, via a communication path, sensing information from respective sensing instruments among a plurality of sensing instruments monitoring and measuring a plurality of physical characteristics of the environment, the sensing information indicating a measured quantitative value of a respective physical characteristic of the environment;
      receive a plurality of predetermined thresholds, a respective predetermined threshold being associated with the respective physical characteristic of the environment;
      compare the obtained sensing information and the respective predetermined threshold;
      determine, based on the comparison, whether the sensing information exceeds the respective predetermined threshold associated with the respective physical characteristic of the environment; and
      generate, based on the determination, an alert identifying a respective sensing instrument when the sensing information exceeds the respective predetermined threshold associated with the respective physical characteristic of the environment.

19. The mobile device of claim 18, wherein the respective physical characteristic of the environment is at least one of a wind speed, a temperature, a moisture content, a gas level, a decibel level and a vibration level.

20. The mobile device of claim 18, wherein the plurality of predetermined threshold values depend on a location of the mobile device.

* * * * *